(12) United States Patent
Yatou et al.

(10) Patent No.: US 9,416,868 B2
(45) Date of Patent: Aug. 16, 2016

(54) SHIFT-BY-WIRE CONTROLLER

(71) Applicant: DENSO CORPORATION, Kariya, Aichi-pref. (JP)

(72) Inventors: Yoshihiro Yatou, Kariya (JP); Kenji Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 139 days.

(21) Appl. No.: 14/317,235

(22) Filed: Jun. 27, 2014

(65) Prior Publication Data

US 2015/0000450 A1    Jan. 1, 2015

(30) Foreign Application Priority Data

Jun. 28, 2013  (JP) .................................. 2013-136416

(51) Int. Cl.
*F16H 61/32* (2006.01)
*F16H 59/10* (2006.01)

(52) U.S. Cl.
CPC ........ F16H 59/105 (2013.01); *F16H 2061/326* (2013.01); *Y10T 74/2003* (2015.01)

(58) Field of Classification Search
CPC ........................... F16H 2061/326; F16H 61/32
See application file for complete search history.

(56) References Cited

U.S. PATENT DOCUMENTS

| | | | | |
|---|---|---|---|---|
| 8,281,681 B2 * | 10/2012 | Kimura | ................... | F16H 61/12 74/335 |
| 2005/0156550 A1 * | 7/2005 | Kamio | .................... | F16H 61/32 318/445 |
| 2005/0174084 A1 | 8/2005 | Nakai et al. | | |
| 2008/0215215 A1 * | 9/2008 | Kashiwagi | .............. | F16H 61/32 701/51 |
| 2010/0250055 A1 * | 9/2010 | Ito | .......................... | F16H 61/12 701/29.2 |
| 2012/0123653 A1 | 5/2012 | Kimura et al. | | |
| 2013/0006486 A1 * | 1/2013 | Shimizu | ................. | F16H 61/12 701/51 |

FOREIGN PATENT DOCUMENTS

| | | |
|---|---|---|
| JP | 2006-336710 | 12/2006 |
| JP | 2007-218298 | 8/2007 |
| JP | 2012-013216 | 1/2012 |

OTHER PUBLICATIONS

Office Action (2 pages) dated May 12, 2015, issued in corresponding Japanese Application No. 2013-136416 and English Translation (2 pages).

* cited by examiner

*Primary Examiner* — Tisha Lewis
(74) *Attorney, Agent, or Firm* — Nixon & Vanderhye P.C.

(57) ABSTRACT

A shift-by-wire controller is applied to a shift-by-wire system which switches a shift range of an automatic transmission by a driving force of a motor, and drives the motor according to an input signal. The shift-by-wire controller includes a position sensor, a position acquirement portion acquiring a switching edge corresponding to a position where the shift range is switched from the position sensor, an encoder detecting a rotational position of the motor, a determining portion determining whether the rotational position can be acquired as a present-position from the encoder, and a position determination portion. When the determining portion determines that the present-position cannot be acquired, the position determination portion drives the motor to switch the shift range, and determines a position of the motor based on the switching edge.

7 Claims, 10 Drawing Sheets

SHIFT-BY-WIRE CONTROLLER

CROSS REFERENCE TO RELATED APPLICATION

This application is based on Japanese Patent Application No 2013-136416 filed on Jun. 28, 2013, the disclosure of which is incorporated herein by reference.

TECHNICAL FIELD

The present disclosure relates to a shift-by-wire controller which electrically controls an automatic transmission.

BACKGROUND

Conventionally, a shift-by-wire which electrically switches a shift range of an automatic transmission by using a switched reluctance motor (SR motor) is well known. When using the SR motor, it is necessary to associate a rotational position of the SR motor with the shift range. According to JP-2012-107657A (US 2012/0123653 A1), when the shift-by-wire is used, an initial position of the SR motor is learned at a time point that a power of a vehicle is turned on. That is, when the power is turned on, a controller of the shift-by wire learns the initial position in a specific shift range such as a P-range. In this case, the P-range is disposed at an end portion. Then, the controller drives the SR motor to move to the specific shift range based on the initial position.

However, according to JP-2012-107657A, when the power is turned on at a time point that the SR motor is placed at a position rather than the P-range, the initial position cannot be learned. Therefore, when the power is turned on at a time point that the SR motor is placed at a position rather than the P-range due to a momentary power cut, it is possible that the controller cannot drive the SR motor or switch the shift range.

SUMMARY

It is an object of the present disclosure to provide a shift-by-wire controller determining a rotational position of a motor without respect to a shift range.

According to an aspect of the present disclosure, a shift-by-wire controller is applied to a shift-by-wire system which switches a shift range of an automatic transmission by a driving force of a motor, and drives the motor according to an input signal. The shift-by-wire controller includes a position sensor detecting whether the automatic transmission is placed at one of a plurality of the shift ranges, a position acquirement portion acquiring a switching edge corresponding to a position where the shift range is switched, from the position sensor, every time that the shift range is switched, an encoder detecting a rotational position of the motor, a determining portion determining whether the rotational position can be acquired as a present-position from the encoder, and a position determination portion driving the motor to switch the shift range, and determining a position of the motor based on the switching edge acquired by the position acquirement portion, when the determining portion determines that the present-position cannot be acquired. Therefore, even though the automatic transmission is not placed at a specified shift range, the rotational position of the motor can be determined without respect to the shift range.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, embodiments of a shift-by-wire controller will be described. In addition, the substantially same parts and the components in the embodiments are indicated with the same reference numeral and the same description will be omitted. Further, a shift-by-wire is referred to as a SBW, and the shift-by-wire controller is referred to as a controller.

First Embodiment

Figure 1:
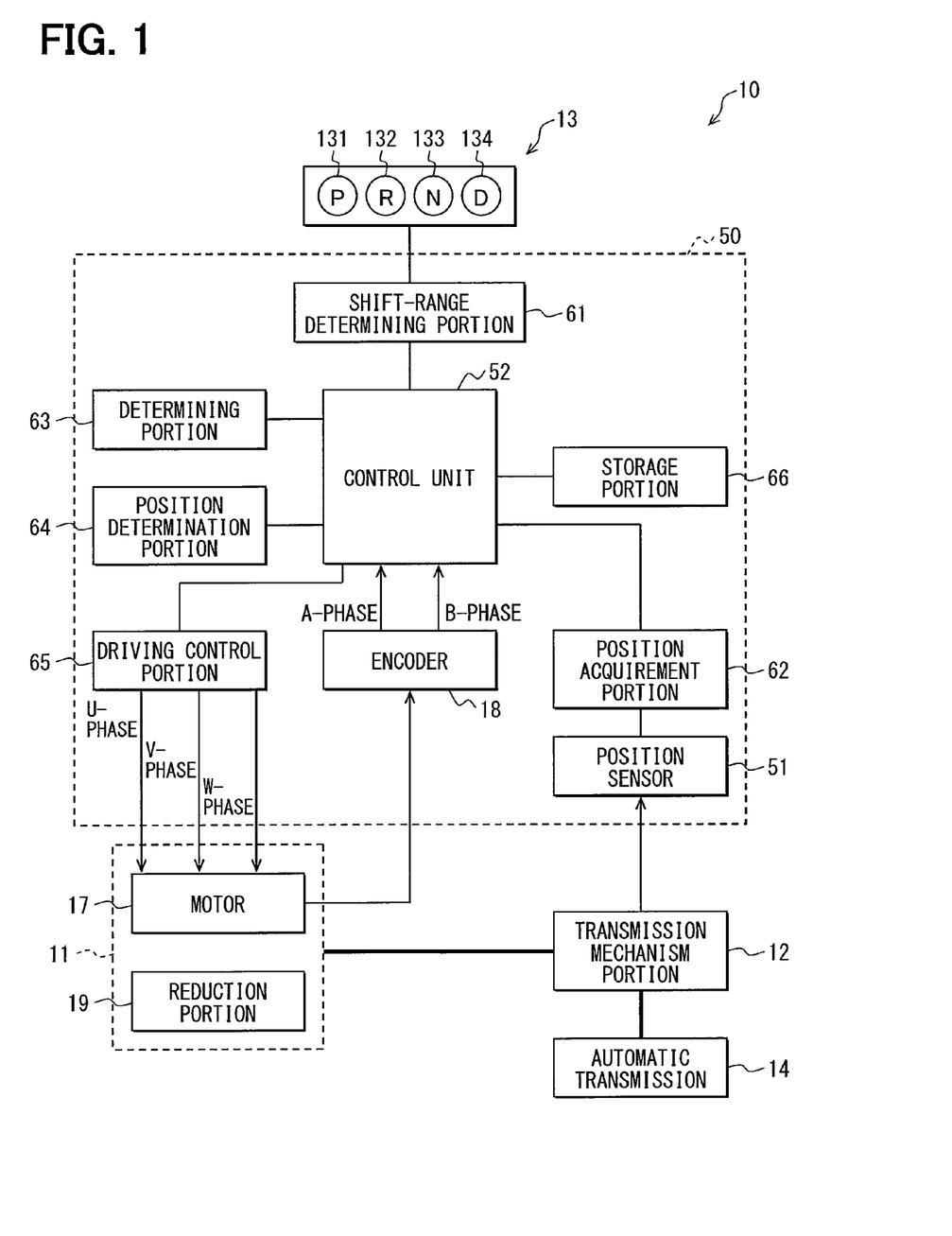
FIG. 1 is a block diagram showing an outline of a shift-by-wire controller according to a first embodiment of the present disclosure.
Figure 2:
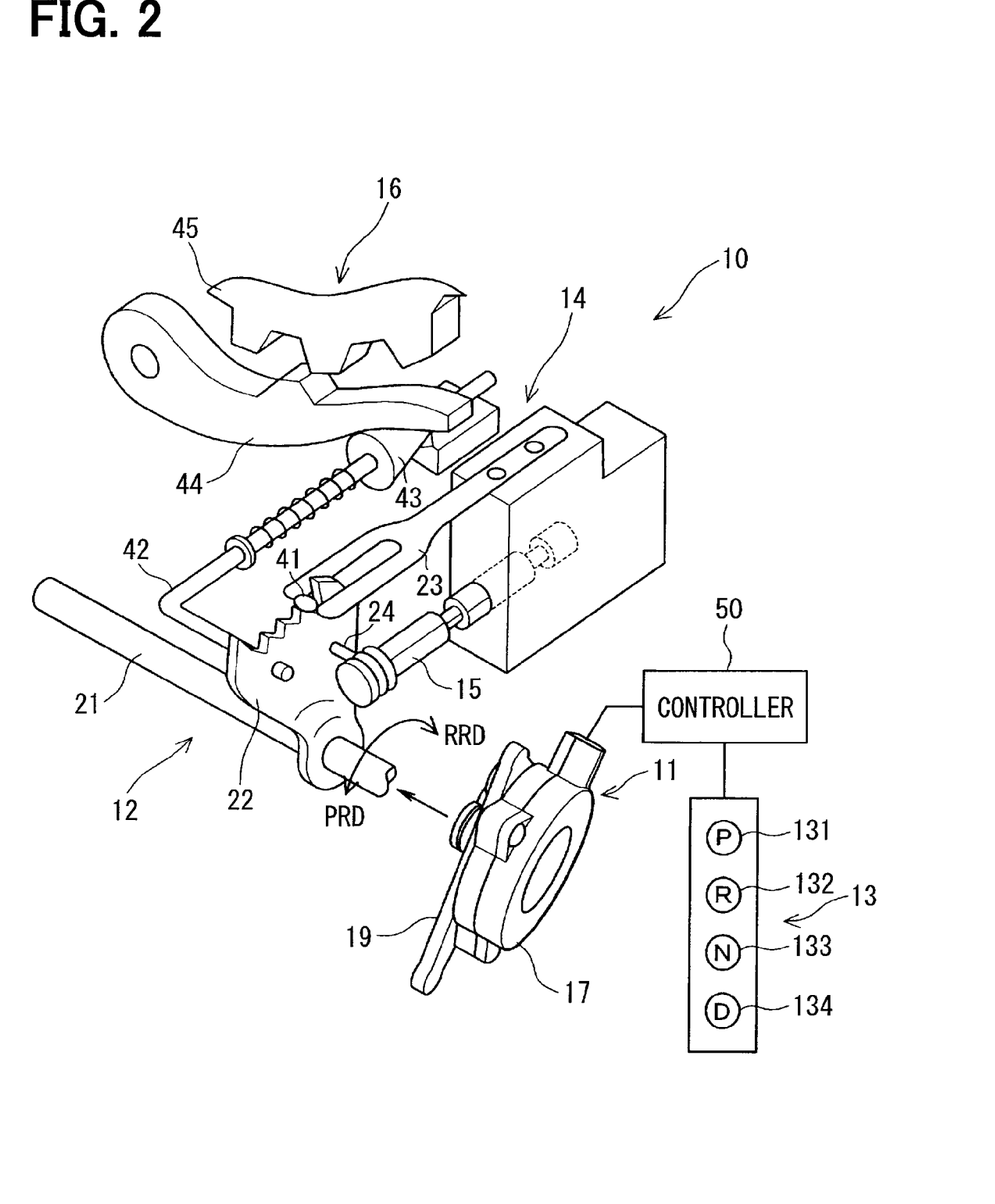
FIG. 2 is a diagram showing a shift-by-wire system according to the first embodiment.

First, a SBW system 10 will be described. As shown in FIGS. 1 and 2, the SBW system 10 includes an actuator 11, a transmission mechanism portion 12, and a shift switch 13 which is functioned as an input portion. The actuator 11 drives a manual valve 15 of an automatic transmission 14 and a parking lock portion 16. The actuator 11 includes a motor 17 and a reduction portion 19. The motor 17 generates a driving force when being energizing. The reduction portion 19 reduces the driving force generated by the motor 17 and transmits the driving force to the transmission mechanism portion 12. According to the present embodiment, the motor 17 is a switched reluctance motor (SR motor), and generates the driving force without using a permanent magnet. The transmission mechanism portion 12 transmits the driving force outputted from the reduction portion 19 to the manual valve 15 and the parking lock portion 16.

The transmission mechanism portion 12 includes a shaft 21, a plate 22, and a spring 23. The shaft 21 is connected to the reduction portion 19, and is rotatably driven by the driving force of the motor 17. The plate 22 outwardly extends from the shaft 21 in a radial direction of the shaft 21, and is seamlessly integrated with the shaft 21. The plate 22 is rotatably driven by the actuator 11 together with the shaft 21. The plate 22 includes a pin 24 extending from the plate 22 in a direction substantially parallel to the shaft 21. The pin 24 is connected to the manual valve 15. Since the plate 22 rotates together with the shaft 21, the manual valve 15 reciprocally moves in an axial direction of the manual valve 15. The transmission mechanism portion 12 converts the driving force of the actuator 11 to a linear motion and transmits the linear motion to the manual valve 15.

Figure 3:
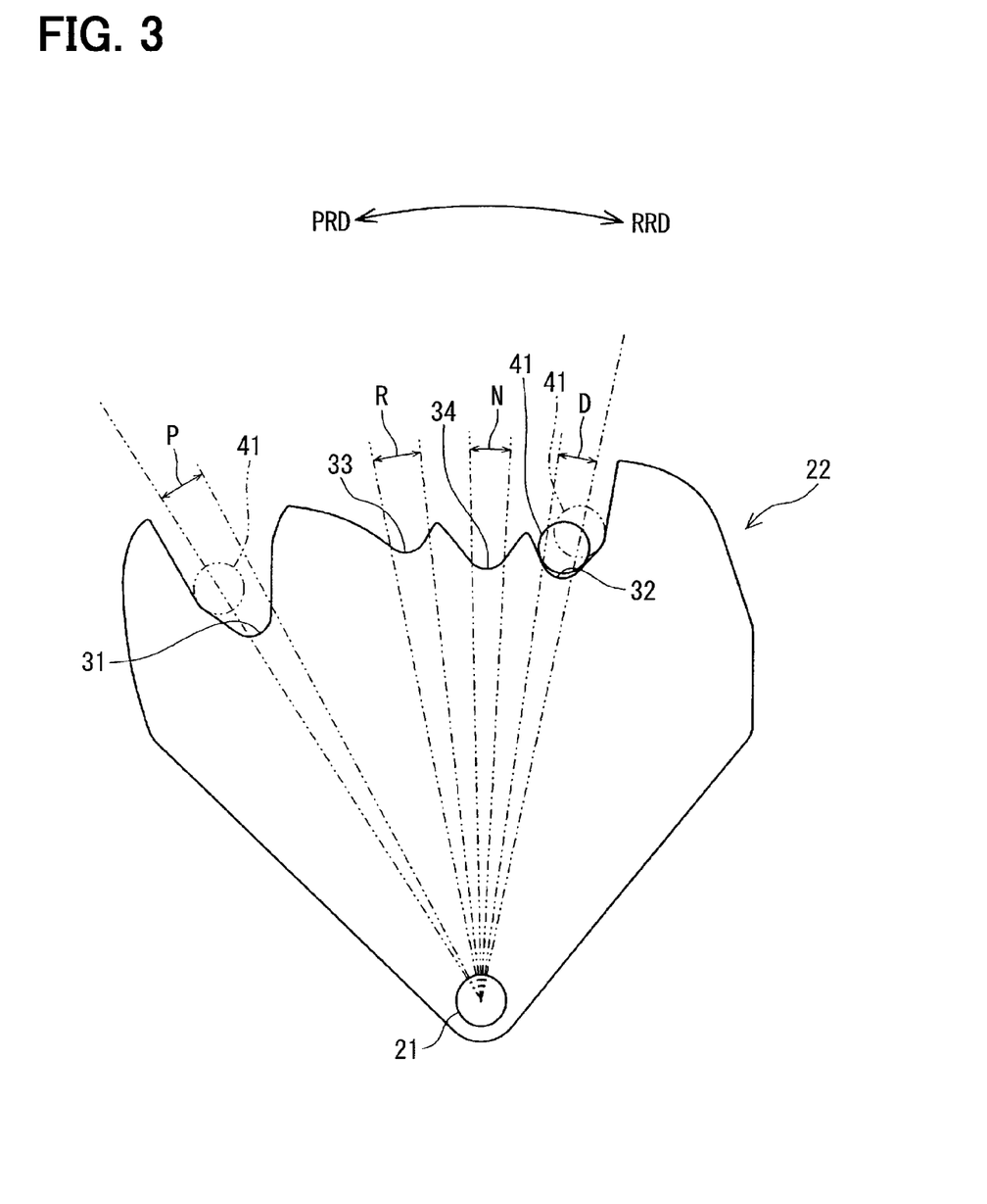
FIG. 3 is a diagram showing a relationship between a plate and shift ranges, in the shift-by-wire system according to the first embodiment.

As shown in FIG. 3, the plate 22 includes a plurality of recessions at an outer peripheral end portion in a radial direction. Specifically, the plate 22 includes a first end recession 31, a second end recession 32, a first intermediate recession 33, and a second intermediate recession 34. The first end recession 31 is disposed at a first end portion in a rotational direction of the plate 22. The second end recession 32 is disposed at a second end portion in the rotational direction of the plate 22. The first intermediate recession 33 and the second intermediate recession 34 are disposed between the first end recession 31 and the second end recession 32.

According to the present embodiment, the first end recession 31, the second end recession 32, the first intermediate recession 33, and the second intermediate recession 34, correspond to shift ranges of the automatic transmission 14. Specifically, the first end recession 31 corresponds to a P-range that is for parking. The second end recession 32 corresponds to a D-range that is for driving. The first intermediate recession 33 corresponds to an R-range that is for reversing. The second intermediate recession 34 corresponds to an N-range that is for making the automatic transmission 14 neutral. According to the present embodiment, the P-range and the D-range are disposed at end portions, and the R-range and the N-range are disposed therebetween from the P-range in the order of the R-range and the N-range.

As shown in FIG. 2, the spring 23 includes a roller 41 at an end portion of the spring 23. The roller 41 is used as a limiting member. When the driving force is applied to the plate 22 in the rotational direction of the plate 22, the roller 41 moves between the first end recession 31, the second end recession 32, the first intermediate recession 33, and the second intermediate recession 34. When the plate 22 rotates in a case where the roller 41 is placed at the first end recession 31, the roller 41 moves to the first intermediate recession 33 by crossing over a protrusion between the first end recession 31 and the first intermediate recession 33. Therefore, since the shaft 21 is rotated by the actuator 11, a position of the manual valve 15 in the axial direction and a state of the parking lock portion 16 are changed. The shift range of the automatic transmission 14 is switched to one of the P-range, the R-range, the N-range, and the D-range. The roller 41 limits a rotation of the plate 22 by inserting into one of the first end recession 31, the second end recession 32, the first intermediate recession 33, and the second intermediate recession 34. Therefore, the position of the manual valve 15 in the axial direction and the state of the parking lock portion 16 are fixed.

That is, the shift range of the automatic transmission 14 is fixed to one of the P-range, the R-range, the N-range, and the D-range.

According to the present disclosure, a rotational direction of the shift range from the P-range toward the R-range, the N-range, and the D-range, is referred to as a positive rotational direction (PRD). In contrast, a rotational direction of the shift range from the D-range toward the N-range, the R-range, and the P-range, is referred to as a reverse rotational direction (RRD). Further, according to the present embodiment, the P-range and the D-range correspond to end shift ranges disposed at end portions.

The parking lock portion 16 includes a rod 42, a taper portion 43, a lock pole 44 and a parking gear 45. When the shift range is switched to the P-range, the taper portion 43 disposed at an end portion of the rod 42 presses the lock pole 44 toward the parking gear 45, such that the lock pole 44 is fit to the parking gear 45. Therefore, the lock pole 44 and the parking gear 45 are engaged with each other, and the parking gear 45 is locked. As a result, a wheel of a vehicle is limited from rotating.

The shift switch 13 receives an input of the shift range. In other words, a user inputs a required shift range by using the shift switch 13. The shift switch 13 includes a P-switch 131, an R-switch 132, an N-switch 133, and a D-switch 134, which correspond to the P-range toward the R-range, the N-range, and the D-range, respectively. When the P-switch 131, the R-switch 132, the N-switch 133, or the D-switch 134 is operated, a controller 50 uses the shift range corresponding to an operated switch among the switches 131 to 134 as the required shift range. The controller 50 corresponding to the shift-by-wire controller drives the motor 17 to switch the shift range to a target shift range corresponding to the required shift range.

Next, the controller 50 applied to the SBW system 10 will be described.

As shown in FIG. 1, the controller 50 includes a position sensor 51, an encoder 18, and a control unit 52. The position sensor 51 is disposed at the actuator 11 or the shaft 21. The position sensor 51 detects whether the shift range is switched to one of the P-range, the R-range, the N-range, and the D-range, based on an output shaft (not shown) of the motor 17 or a rotational degree of the shaft 21 which are driven by the motor 17. The position sensor 51 outputs an electrical signal corresponding to the detected shift range to the control unit 52. The position sensor 51 is constructed by a pair of electrodes which are not shown. One (first electrode) of the electrodes is disposed at the shaft 21, and the other one (second electrode) of the electrodes is disposed to oppose to an outer periphery of the shaft 21. The electrodes have different resistance values. In this case, the position sensor 51 outputs the shift range corresponding to the rotational degree of the shaft 21 as the electrical signal, based on the resistance values of the first and second electrodes. When the shift range is switched to the P-range, the position sensor 51 outputs a P-signal. When the shift range is switched to the R-range, the position sensor 51 outputs an R-signal. When the shift range is switched to the N-range, the position sensor 51 outputs an N-signal. When the shift range is switched to the D-range, the position sensor 51 outputs a D-signal. In addition, according to the present embodiment, the above configuration of the position sensor 51 is an example. The position sensor 51 may have other configurations such that the shift range can be physically detected, for example, the position sensor 51 may use a contact point (node), a magnetic flux, or a light, to detect the shift range.

The encoder 18 is constructed by a magnet and a hall-effect integrated circuit (hall-effect IC) which are not shown. The magnet rotates integrally with a rotor of the motor 17, and the rotor is not shown. The hall-effect IC is disposed to oppose to the magnet, so as to cause a magnetic flux generated by the magnet flow through the hall-effect IC. The hall-effect IC outputs a rotational degree (rotational position) of the motor 17 as a pulse signal, according to a variation of the magnetic flux. The encoder 18 outputs signals corresponding to an A-phase and a B-phase.

The control unit 52 is constructed by a microcomputer including a CPU, a ROM, and a RAM. The control unit 52 controls the SBW system 10 by executing a computer program stored in the ROM. The control unit 52 functions as a shift-range determining portion 61, a position acquirement portion 62, a determining portion 63, a position determination portion 64, and a driving control portion 65, by executing the computer program. In addition, the shift-range determining portion 61, the position acquirement portion 62, the determining portion 63, the position determination portion 64, and the driving control portion 65, are not limited to be accomplished by using software. The shift-range determining portion 61, the position acquirement portion 62, the determining portion 63, the position determination portion 64, and the driving control portion 65, may be accomplished by using hardware or an association between software and hardware. The controller 50 further includes a storage portion 66. According to the present embodiment, the storage portion 66 is constructed by a memory device that is nonvolatile. The storage portion 66 also may be a part of the RAM or the ROM.

Figure 4:
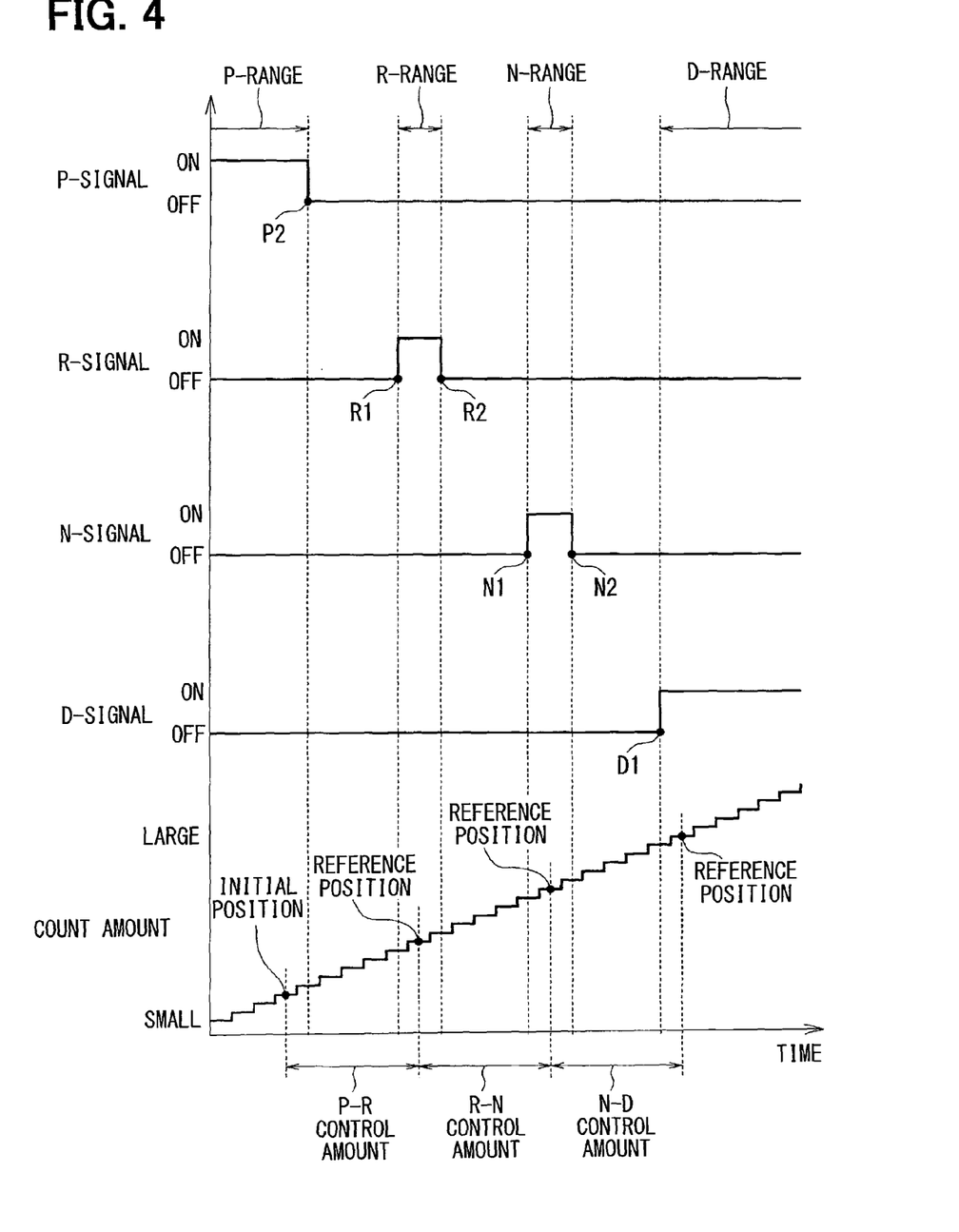
FIG. 4 is a diagram showing a relationship between signals of a position sensor corresponding to the shift ranges and a count amount of a range counter, in the shift-by-wire system according to the first embodiment.

The position acquirement portion 62 acquires a switching edge from the position sensor 51 every time that the shift range is switched. The switching edge corresponds to a position that the shift range is switched. Specifically, as shown in FIG. 4, since the shift range is switched from the P-range to the R-range, the position sensor 51 turns off the P-signal which is turned on. In other words, the position sensor 51 turns on the P-signal in a case where the shift range is switched to the P-range, and turns off the P-signal in a case where the shift range is switched to a position rather than the P-range. A changing point that the P-signal is changed to be turned off is referred to as a switching edge P2. A changing point that the R-signal is changed to be turned on is referred to as a switching edge R1. A changing point that the R-signal is changed to be turned off is referred to as a switching edge R2. A changing point that the N-signal is changed to be turned on is referred to as a switching edge N1. A changing point that the N-signal is changed to be turned off is referred to as a switching edge N2. A changing point that the D-signal is changed to be turned on is referred to as a switching edge D1. The position acquirement portion 62 acquires the switching edge P2, the switching edge R1, the switching edge R2, the switching edge N1, the switching edge N2, and the switching edge D1, based on a signal outputted from the position sensor 51, every time that the shift range is switched. Then the switching edge P2, the switching edge R1, the switching edge R2, the switching edge N1, the switching edge N2, and the switching edge D1, are stored in the storage portion 66 as edge learning values.

The position acquirement portion 62 acquires driving amounts of the motor 17 between the shift ranges of the automatic transmission 14, every time that the shift range is switched. In other words, the position acquirement portion 62 acquires the rotational degree of the motor 17 as the driving amount from the encoder 18, every time that the shift range is switched. The position acquirement portion 62 calculates the driving amount as a count amount of a range counter, based on an output value of the A-phase and an output value of the B-phase which are outputted by the encoder 18. The position acquirement portion 62 acquires the driving amount of the motor 17 which is necessary to switch the shift range, based on the count amount. Further, the position acquirement portion 62 calculates the driving amount from the P-range to the R-range as a P-R control amount, calculates the driving amount from the R-range to the N-range as an R-N control amount, and calculates the driving amount from the N-range to the D-range as an N-D control amount. The position acquirement portion 62 stores the above driving amounts in the storage portion 66 as shift learning values.

The determining portion 63 determines whether the rotational position of the motor 17 can be acquired from the encoder 18 as the present-position. When a learning of an initial position is executed at the P-range, the encoder 18 outputs a rotational position relative to the initial position as an output value of the range counter. When an output of the range counter outputted from the encoder 18 is continuous in a case where the initial position is learned, the rotational position of the motor 17 is acquired as the present-position based on the output value of the range counter. When a momentary power cut is generated, the output value of the range counter becomes a value corresponding to a random position after a power is turned on. In other words, when the momentary power cut is generated, the output value of the range counter becomes intermittent. Therefore, the rotational position of the motor 17 cannot be acquired as the present-position with respect to the initial position that is a standard position. The determining portion 63 determines whether the rotational position of the motor 17 can be acquired as the present-position, according to the output value of the range counter outputted from the encoder 18. The learning of the initial position is executed by the control unit 52. The control unit 52 corresponds to an initial-position learning portion.

When the determining portion 63 determines that the present-position of the motor 17 cannot be acquired, the position determination portion 64 determines the rotational position of the motor 17 as an estimating position Ps. Specifically, the position determination portion 64 detects the shift range based on the signal outputted from the position sensor 51. Usually, the automatic transmission 14 is placed at one of the P-range, the R-range, the N-range, and the D-range. It is unlikely that the automatic transmission 14 is placed between the shift ranges. Thus, the position determination portion 64 can detect the shift range from the P-range, the R-range, the N-range, and the D-range which are acquired from the position sensor 51 by the position acquirement portion 62. Further, the position determination portion 64 drives the motor 17 to switch the shift range of the automatic transmission 14. When the shift range is switched, the position sensor 51 turns on or turns off the P-signal, the R-signal, the N-signal, and the D-signal. Then, the position acquirement portion 62 acquires the switching edge P2, the switching edge R1, the switching edge R2, the switching edge N1, the switching edge N2, or the switching edge D1, from an output of the position sensor 51. The position determination portion 64 determines the present-position of the motor 17, based on the switching edge P2, the switching edge R1, the switching edge R2, the switching edge N1, the switching edge N2, or the switching edge D1.

The driving control portion 65 drives the motor 17 such that the automatic transmission 14 is switched to the target shift range corresponding to a signal inputted by the shift switch 13. In this case, the driving control portion 65 drives the motor 17, based on the present-position of the motor 17 determined by the position determination portion 64, and edge learning values stored in the storage portion 66.

Next, referring to FIG. 5, an operation of the SBW system 10 provided with the above configuration will be described.

When the SBW system 10 is energized, at S101, the control unit 52 determines whether the learning of the initial position is available. For example, when the shift range is placed at a specified shift range such as the P-range, the learning of the initial position is executed. In other words, when the shift range of the automatic transmission 14 is switched to the specified shift range, the control unit 52 determines that the learning of the initial position is available. When the control unit 52 determines that the learning of the initial position is available (S101: Yes), the control unit 52 proceeds to S102. At S102, the control unit 52 executes the learning of the initial position. When the shift range is switched to the specified shift range such as the P-range, the initial position is set to be the rotational degree of the motor 17 detected by the encoder 18. In addition, the learning of the initial position is well known and is omitted.

At S103, the control unit 52 determines whether a switching request of the shift range is generated. When the control unit 52 determines that the switching request of the shift range is generated (S103: Yes), the control unit 52 proceeds to S104. At S104, the control unit 52 drives the motor 17 according to the driving amount that is predetermined, and executes a switching control to switch the shift range to the target shift range. In other words, the control unit 52 drives the motor 17 to switch the shift range to the target shift range, based on the P-R control amount, the R-N control amount, and the N-D control amount which are stored in the storage portion 66. When the control unit 52 determines that the switching request of the shift range is not generated (S103: No), the control unit 52 waits until the switching request is generated. At S105, the control unit 52 acquires the rotational degree of the motor 17 from a present shift range to the target shift range as the shift learning value. In other words, the control unit 52 corrects and updates the shift learning value every time that the shift range is switched.

An operation of the present embodiment is executed in a case where the learning of the initial position is not available at S101. In other words, when the control unit 52 determines that the learning of the initial position is not available (S101: No), the control unit 52 proceeds to S106. At S106, the control unit 52 executes a present-position determination operation. As shown in FIG. 6, when the present-position determination operation is executed, at S201, the position sensor 51 detects the present shift range. At S202, the determining portion 63 determines whether the rotational position of the motor 17 can be acquired from the encoder 18 as the present-position. When the determining portion 63 determines that the present-position of the motor 17 cannot be acquired (S202: No), the position determination portion 64 drives the motor 17 at S203. Since the motor 17 is driven, the shift range is switched. At 204, the position acquirement portion 62 acquires one of the switching edge P2, the switching edge R1, the switching edge R2, the switching edge N1, the switching edge N2, and the switching edge D1. At S205, the position determination portion 64 determines the present-position of the motor 17, based on the switching edge acquired at S204. When the count amount of the counter becomes intermittent due to the momentary power cut, the present-position of the motor 17 is undetermined. Then, the determining portion 63 determines that the present-position of the motor 17 cannot be acquired. Even though the present-position of the motor 17 is undetermined, the position acquirement portion 62 acquires one of the switching edges by driving the motor 17. Then, the position determination portion 64 determines the present-position of the motor 17 based on the switching edge acquired by the position acquirement portion 62.

When the motor 17 is driven in a case where the shift range is placed at the N-range, the position acquirement portion 62 detects the switching edge N1 or the switching edge N2. In this case, the position sensor 51 outputs the N-signal corresponding to the N-range. Even though the present-position of the motor 17 cannot be acquired from the encoder 18, when the motor 17 is rotated in the positive rotational direction, the position determination portion 64 can accurately determine the present-position of the motor 17 based on the switching edge N2 acquired by the position acquirement portion 62. In other words, the present-position of the motor 17 is determined based on a relationship between the rotational position acquired from the encoder 18 according to a rotation of the motor 17 and the rotational position where the switching edge N2 is outputted. That is, when the output of the position sensor 51 is the N-signal and the switching edge N2 is outputted, it is determined that the motor 17 is placed at a position corresponding to the switching edge N2. In addition, when the shift range is placed at a position rather than the N-range, the present-position of the motor 17 is determined in the same manner.

Figure 5:
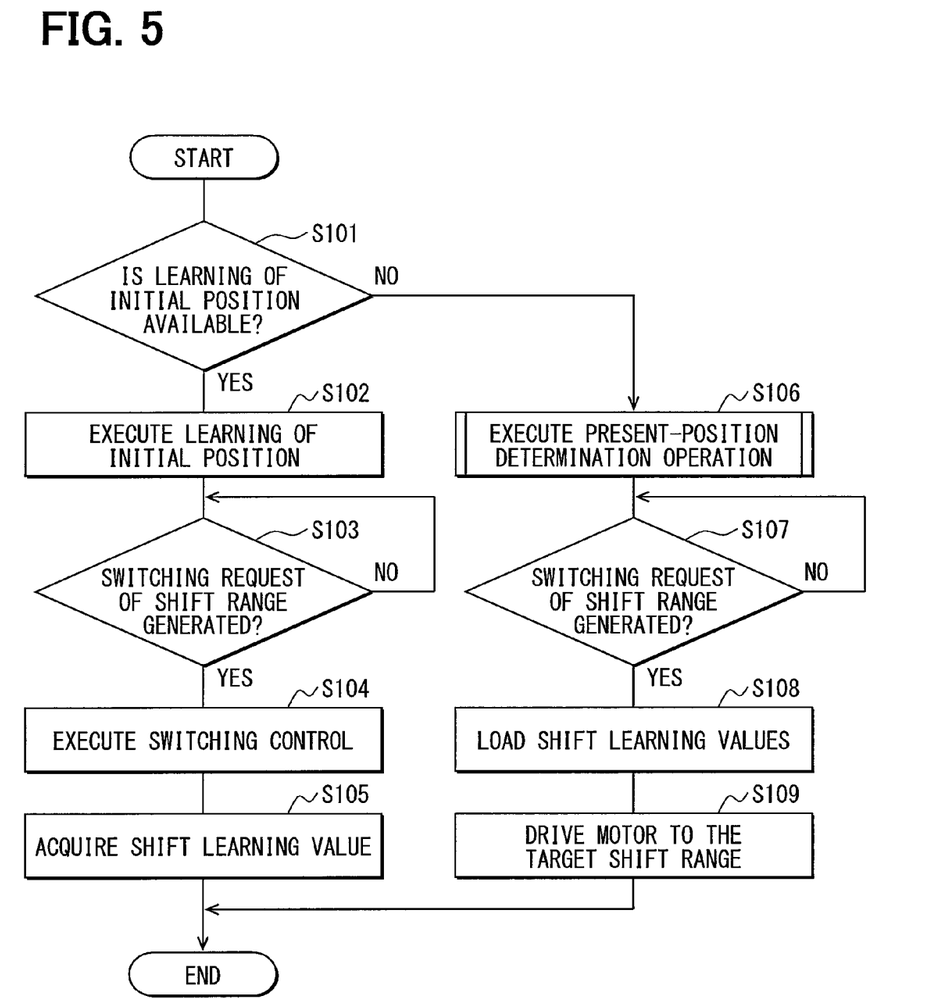
FIG. 5 is a flowchart showing a main control in the shift-by-wire controller according to the first embodiment.
Figure 6:
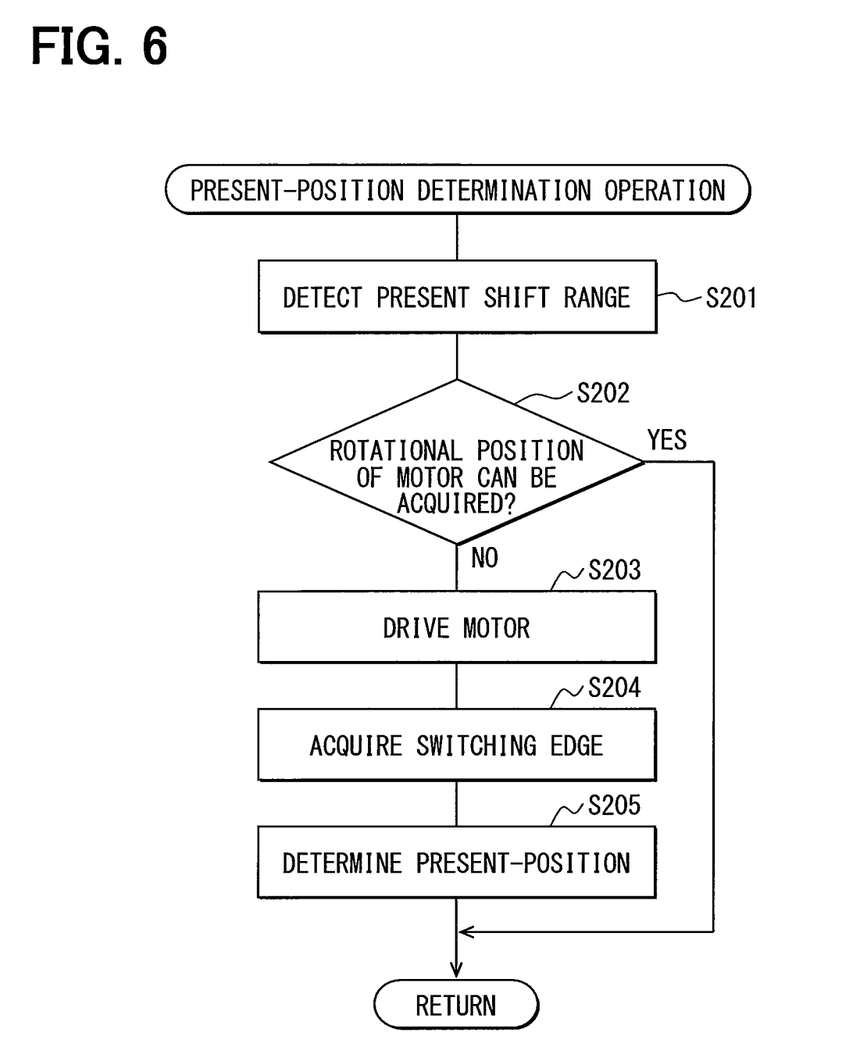
FIG. 6 is a flowchart showing a present-position determination control.

When the present-position of the motor 17 is determined by the position determination portion 64, the control unit 52 returns to a main control shown in FIG. 5. When the determining portion 63 determines that the present-position of the motor 17 can be acquired at S202 (S202: Yes), the control unit 52 directly returns to the main control shown in FIG. 5.

When the control unit 52 completes the present-position determination operation, at S107, the control unit 52 determines whether the switching request of the shift range is generated. When the control unit 52 determines that the switching request of the shift range is generated (S107: Yes), the control unit 52 proceeds to S108. At S108, the control unit 52 loads the shift learning values acquired at S105 and stored in the storage portion 66. At S109, the driving control portion 65 drives the motor 17 to switch the shift range to the target shift range corresponding to the switching request, based on the present-position of the motor 17 determined at S106 and the shift learning values loaded from the storage portion 66.

Even though it is determined that the present-position of the motor 17 cannot be acquired at S202, since the switching edge is acquired at S204, the present-position of the motor 17 is determined at S205. The driving amounts of the motor 17 between the shift ranges are stored in the storage portion 66 as the shift learning values. The driving control portion 65 can calculate the rotational position (rotational degree) of the motor 17 which is necessary to switch the shift range to the target shift range as a calculated target position, based on the present-position of the motor 17 determined at S205 and the shift learning values stored in the storage portion 66. The position acquirement portion 62 acquires the switching edge every time that the shift range is switched according to a driving of the motor 17. Further, the driving control portion 65 may correct the driving amount of the motor 17 corresponding to an amount that is necessary to switch the shift range to the calculated target position, based on the edge learning value acquired by the position acquirement portion 62.

According to the first embodiment, the controller 50 includes the position sensor 51. The position sensor 51 detects the shift range of the automatic transmission 14 switched to one of the P-range, the R-range, the N-range, and the D-range. When it is determined that the present-position of the motor 17 cannot be acquired from the encoder 18, the position determination portion 64 determines whether the automatic transmission 14 is placed at one of the shift ranges from the position sensor 51. The position determination portion 64 drives the motor 17 to switch the shift range of the automatic transmission 14 from the shift range detected by the position sensor 51. In this case, the P-signal, the R-signal, the N-signal, or the D-signal which is outputted by the position sensor 51 changes every time that the shift range of the automatic transmission 14 is switched. The position acquirement portion 62 acquires a changing point of the signal outputted from the position sensor 51 as the switching edge, based on a variation of the signal. The position determination portion 64 determines the rotational position of the motor 17, based on the shift range detected by the position sensor 51 and the switching edge acquired by the position acquirement portion 62. Even though the shift range of the automatic transmission 14 is not placed at the specified shift range, the rotational position of the motor 17 can be determined without respect to the shift range.

According to the first embodiment, the driving control portion 65 drives the motor 17 to switch to the target shift range, based on the present-position of the motor 17 determined by the position determination portion 64 and the shift learning values stored in the storage portion 66. Even though the initial position of the motor 17 is not learned due to the momentary power cut, the driving control portion 65 sets the driving amount of the motor 17 corresponding to the target shift range, based on the present-position of the motor 17 determined by the position determination portion 64 and the learning values. The driving control portion 65 drives the motor 17 to a position corresponding to the target shift range according to the driving amount of the motor 17. Thus, even though the rotational position of the motor 17 cannot be determined due to a power recovery after the momentary power cut, the automatic transmission 14 can be accurately switched to a specified shift range.

According to the first embodiment, the driving control portion 65 drives the motor 17, and corrects the driving amount of the motor 17 corresponding to the amount that is necessary to switch the shift range to the calculated target position, based on the edge learning value acquired by the position acquirement portion 62. The switching edge is updated every time that the shift range is switched according to the driving of the motor 17. An accuracy of controlling the motor 17 is further improved by correcting the driving amount of the motor 17 using the switching edge lately updated. Therefore, the automatic transmission 14 can be further accurately switched to the specified shift range.

Second Embodiment

The controller according to a second embodiment will be described.

The substantially same parts and the components as the first embodiment are indicated with the same reference numeral and the same description will be omitted. Further, the second embodiment has different features from the first embodiment. Specifically, an operation is added between S101 and S102 which are shown in FIG. 5. Hereafter, referring to FIG. 7, the different features of the second embodiment will be described.

Figure 7:
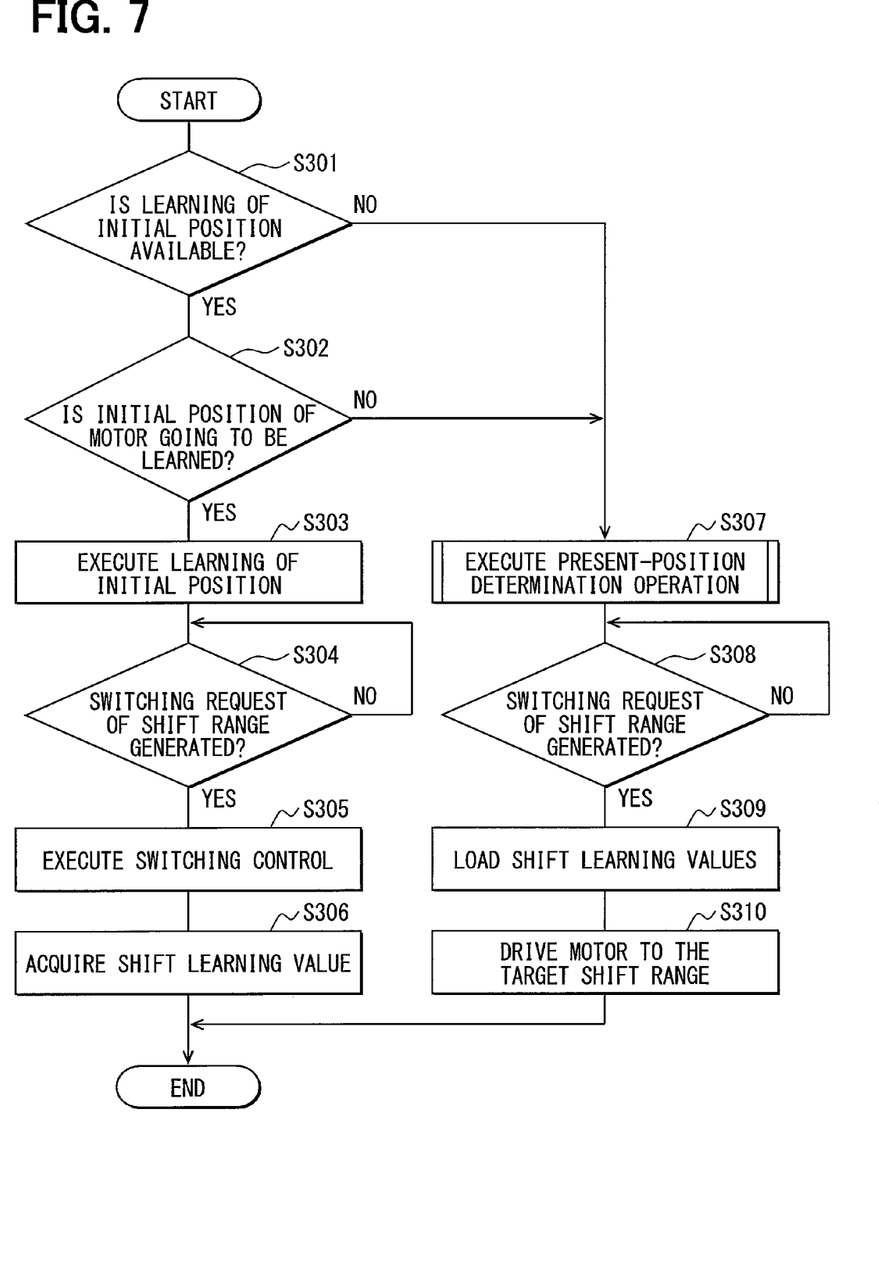
FIG. 7 is a flowchart showing the main control in the shift-by-wire controller according to a second embodiment of the present disclosure.

At S301, the control unit 52 determines whether the learning of the initial position is available. When the control unit 52 determines that the learning of the initial position is available (S301: Yes), the control unit 52 proceeds to S302. At S302, the control unit 52 determines whether the initial position of the motor 17 is going to be learned. When the control unit 52 determines that the initial position of the motor 17 is going to be learned (S302: Yes), the control unit 52 executes operations from S303 to S306 corresponding to operations from S102 to S105 in the first embodiment. When the control unit 52 determines that the learning of the initial position is not available at S301 (S301: No), or when the control unit 52 determines that the initial position of the motor 17 is not going to be learned (S302: No), the control unit 52 executes operations from S307 to S310 corresponding to operations from S106 to S109 in the first embodiment.

The position determination portion 64 can determine the present-position of the motor 17 without learning the initial position as the same as the first embodiment. Therefore, even though the initial position of the motor 17 can be learned at S301 (e.g., when the shift range is switched to the P-range), it is not necessary to learn the initial position. When the present-position of the motor 17 has been determined by the position determination portion 64, the control unit 52 determines that the initial position of the motor 17 will not be learned at S302. According to the second embodiment, when the present-position of the motor 17 is determined after a position of the motor 17 is reset due to the momentary power cut, the initial position of the motor 17 will not be learned even though the initial position of the motor 17 is switched to a shift range that can be learned. Therefore, a responsivity of an operation of the user can be improved.

Third Embodiment

Figure 8:
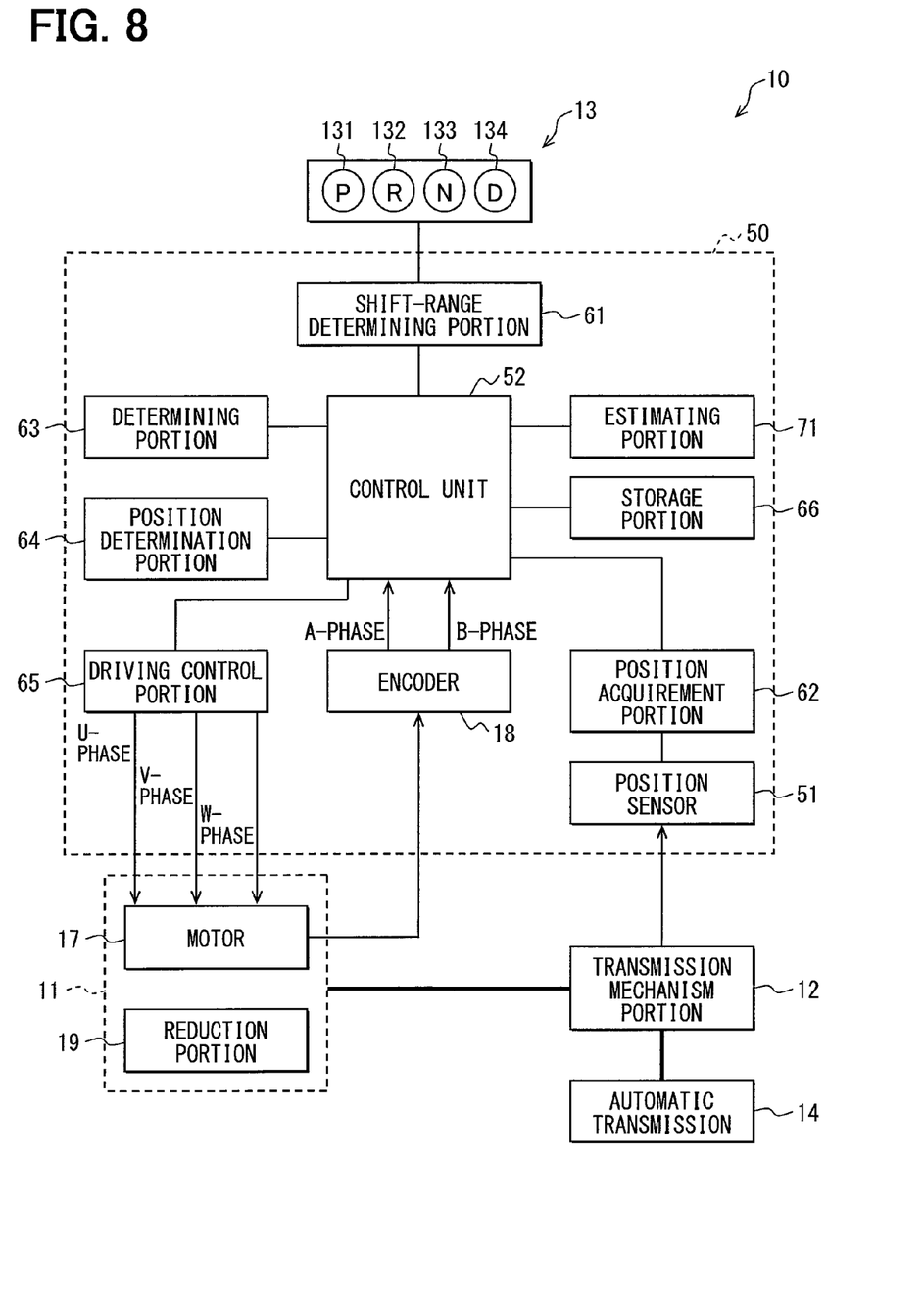
FIG. 8 is a block diagram showing an outline of the shift-by-wire controller according to a third embodiment of the present disclosure.

FIG. 8 is a block diagram showing the controller according to a third embodiment.

According to the third embodiment, the controller 50 further includes an estimating portion 71. The estimating portion 71 is accomplished by software by executing a computer program in the control unit 52. According to the present disclosure, the estimating portion 71 may be accomplished by hardware or an association between software and hardware.

The estimating portion 71 estimates a position of the present shift range, based on the required shift range received by the shift switch 13, the shift range detected by the position sensor 51 in a normal state, and the switching edge detected by the position acquirement portion 62 in the normal state. According to the present disclosure, in the normal state, the momentary power cut is not generated. The shift switch 13 determines one of the P-range, the R-range, the N-range, and the D-range will be switched according to the operation of the user. The position sensor 51 determines that the shift range is one of the P-range, the R-range, the N-range, and the D-range, before the momentary power cut is generated (that is, in the normal state). In the normal state, the position acquirement portion 62 acquires one of the switching edge P2, the switching edge R1, the switching edge R2, the switching edge N1, the switching edge N2, and the switching edge D1, every time that the shift range is switched. The position of the present shift range and the switching edge are stored in the storage portion 66 as the learning values. The estimating portion 71 detects a direction of switching the shift range of the automatic transmission 14 according to the shift switch 13, and estimates the present shift range based on the shift range detected by the position sensor 51 and the switching edge in the normal state.

For example, the momentary power cut is generated during a time period that the shift range is switched from the P-range to the R-range. In this case, even though the power is recovered after the momentary power cut, since the shift range of the automatic transmission 14 is placed between the switching edge P2 and the switching edge R1, the position sensor 51 cannot determine the shift range. When the shift range is placed between the P-range and the R-range, the shift-range determining portion 61 detects that one of the switches 132, 133, and 134 corresponding to one of the P-range, the N-range, and the D-range is inputted. Then, the driving control portion 65 drives the motor 17 to rotate in the positive rotational direction. Further, the position sensor 51 outputs the P-signal indicating that the shift range is placed at the P-range, before the momentary power cut is generated. Therefore, the estimating portion 71 detects that the shift range of the automatic transmission 14 is placed at the P-range, before the momentary power cut is generated. The position acquirement portion 62 learns the switching edge P2 and the switching edge R1 in the normal state. When the shift range cannot be determined, the estimating portion 71 estimates a latest position of the shift range, based on the learning values of the shift ranges and the switching edges, and the required shift range received by the shift switch 13. In addition, the estimating portion 71 estimates the latest position of the shift range in the same manner when estimating other shift ranges.

When the estimating portion 71 estimates the shift range, since the driving of the motor 17 is continued, the position acquirement portion 62 acquires the switching edge from the position sensor 51. The position determination portion 64 corrects the shift range estimated by the estimating portion 71 and determines the position of the shift range, based on the switching edge acquired according to the driving of the motor 17.

When the determining portion 63 determines that the present-position of the motor 17 cannot be acquired, the driving control portion 65 drives the motor 17 from the shift range estimated by the estimating portion 71 to the target shift range. The estimating portion 71 estimates the present shift range based on the shift range detected by the position sensor 51 and the switching edge in the normal state. When the determining portion 63 determines that the present-position of the motor 17 cannot be acquired, the driving control portion 65 determines that the present shift range corresponds to the shift range estimated by the estimated by the estimating portion 71, and drives the motor 17 to switch to the target shift range.

Figure 9:
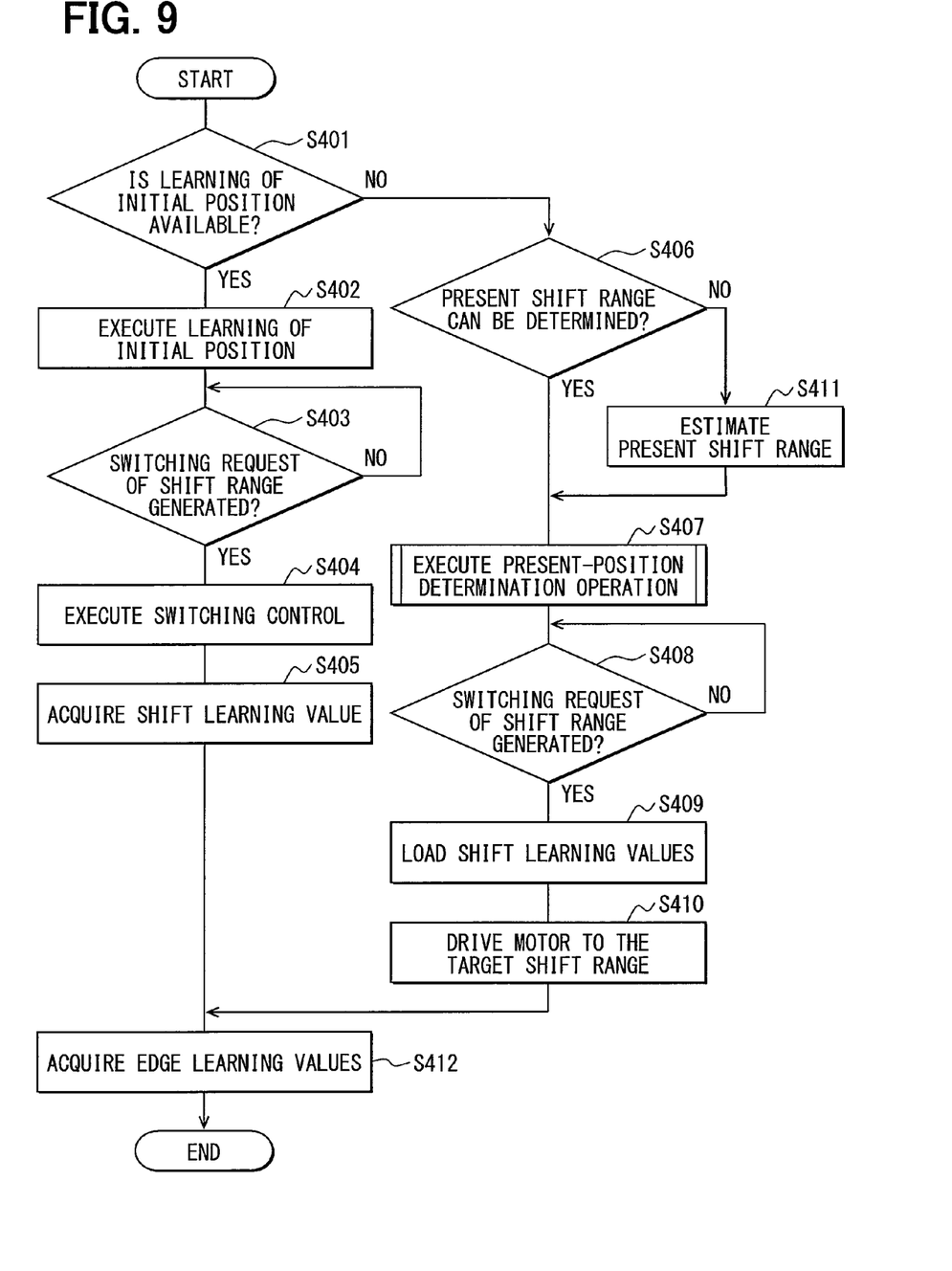
FIG. 9 is a flowchart showing the main control in the shift-by-wire controller according to the third embodiment.

Referring to FIG. 9, the main control according to the third embodiment will be described. According to the third embodiment, an operation is added before the present-position determination operation executed at S106 in the first embodiment as shown in FIG. 5. Hereafter, referring to FIG. 9, the above difference of the third embodiment will be described.

At S401, the control unit 52 determines whether the learning of the initial position is available. When the control unit 52 determines that the learning of the initial position is available (S401: Yes), the control unit 52 executes operations from S402 to S405 corresponding to operations from S102 to S105 in the first embodiment. When the control unit 52 determines that the learning of the initial position is not available at S401 (S401: No), the control unit 52 proceeds to S406. At S406, the control unit 52 determines whether the present shift range can be determined. That is, the control unit 52 determines whether the present shift range can be determined, based on the signal acquired by the position sensor 51. When the control unit 52 determines that the present shift range can be determined at S406 (S406: Yes), the control unit 52 executes operations from S407 to S410 corresponding to operations from S106 to S109 in the first embodiment.

When the control unit 52 determines that the present shift range cannot be determined at S406 (S406: No), the control unit 52 proceeds to S411. At S411, the estimating portion 71 estimates the present shift range. The estimating portion 71 estimates the latest position of the shift range, based on the learning values of the switching edges, the required shift range received by the shift switch 13, and the learning values of the shift ranges in the normal state. The position determination portion 64 determines the position of the motor 17 using operations on and after S407, based on the shift range that is estimated.

At S412, the position acquirement portion 62 acquires the switching edge P2, the switching edge R1, the switching edge R2, the switching edge N1, the switching edge N2, and the switching edge D1 as edge learning values, every time that the shift range is switched after the shift learning values is acquired at S405 and the present shift range is estimated at S411.

According to the third embodiment, when the shift range cannot be determined according to the signal outputted from the position sensor 51, the estimating portion 71 estimates the shift range. That is, when the shift range cannot be estimated, the estimating portion 71 estimates the shift range based on the learning values of the shift ranges and the switching edges in the normal state. The position determination portion 64 estimates the latest position of the shift range and the position of the motor 17 by acquiring the switching edge in a case where the shift range is switched according to the driving of the motor 17. Therefore, the motor 17 can be accurately driven by estimating the shift range.

Fourth Embodiment

The controller 50 according to a fourth embodiment will be described.

The substantially same parts and the components as the first embodiment are indicated with the same reference numeral and the same description will be omitted. According to the fourth embodiment, when the position sensor 51 cannot determine the shift range, the driving control portion 65 switches the shift range of the automatic transmission 14 to the end shift range. The driving control portion 65 drives the motor 17 so as to switch the shift range to the end shift range corresponding to the P-range or the D-range. When the shift range is switched, the position acquirement portion 62 acquires the switching edge from the position sensor 51. The position determination portion 64 determines the present-position of the motor 17 based on the switching edge acquired by the position acquirement portion 62. The driving control portion 65 drives the motor 17 to switch to the required shift range by using the present-position of the motor 17 and the shift learning values.

For example, when the position sensor 51 cannot determine the N-range even though the shift range is placed at the N-range, the driving control portion 65 drives the motor 17 so as to switch the shift range toward the P-range or the D-range. When the shift range is switched toward the P-range, the position sensor 51 outputs the switching edge R2 or the switching edge N2. When the shift range is switched toward the D-range, the position sensor 51 outputs the switching edge N1 or the switching edge D1. Thus, even though the shift range cannot be detected to be placed at the N-range, the switching edge R2, the switching edge N2, the switching edge N1, or the switching edge D1 is detected by forcibly switching the shift range by the motor 17. The position determination portion 64 determines the position of the motor 17 from the switching edge R2, the switching edge N2, the switching edge N1, or the switching edge D1. The driving control portion 65 drives the motor 17 using the position of the motor 17 determined by the position determination portion 64 and the shift learning values, and switches the shift range. When the shift range is switched to a position rather than the N-range, operations are executed in the same manner.

Figure 10:
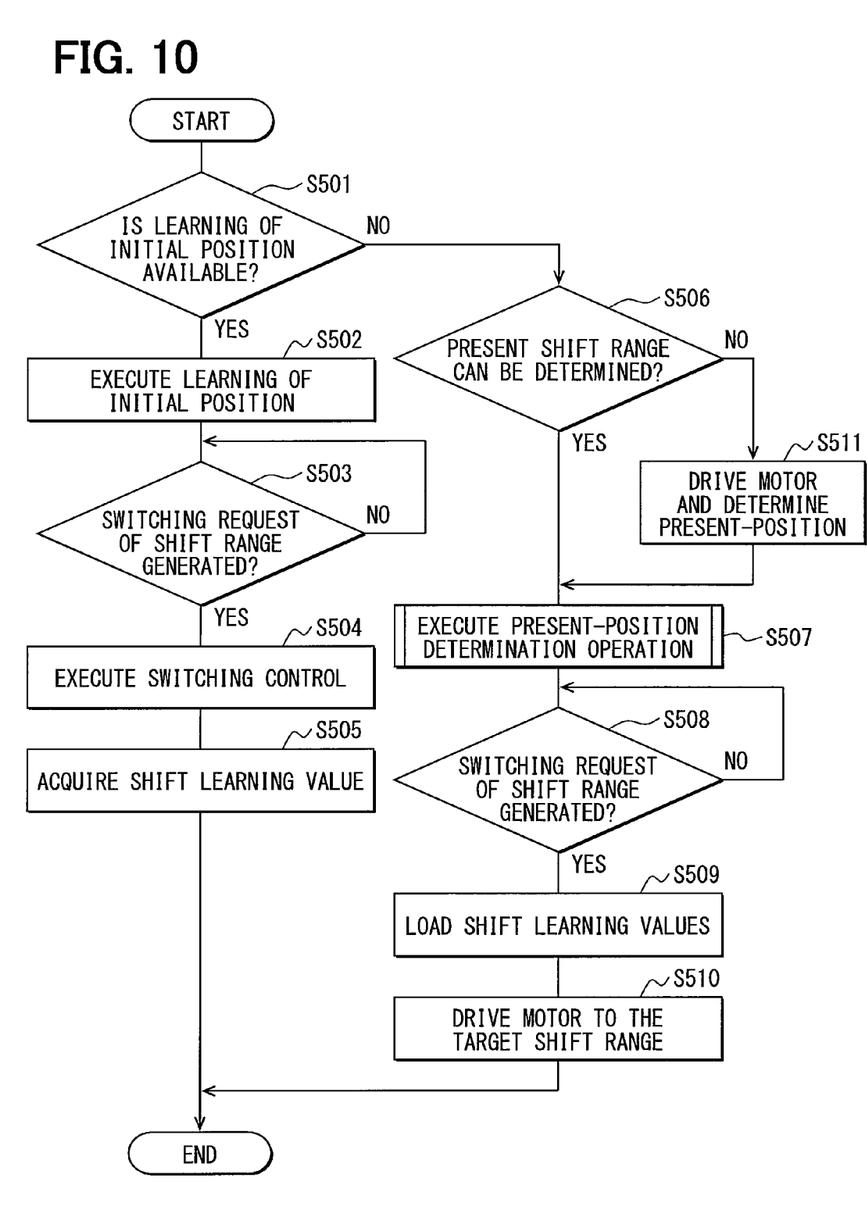
FIG. 10 is a flowchart showing the main control in the shift-by-wire controller according to a fourth embodiment of the present disclosure.

Referring to FIG. 10, the main control according to a fourth embodiment will be described.

Further, the fourth embodiment has different features from the first embodiment. Specifically, an operation is added before S105 which is shown in FIG. 5. Hereafter, the different features of the fourth embodiment will be described.

At S501, the control unit 52 determines whether the learning of the initial position is available. When the control unit 52 determines that the learning of the initial position is available (S501: Yes), the control unit 52 executes operations from S502 to S505 corresponding to operations from S102 to S105 in the first embodiment. When the control unit 52 determines that the learning of the initial position is not available at S501 (S501: No), the control unit 52 proceeds to S506. At S506, the control unit 52 determines whether the present shift range can be determined. That is, the control unit 52 determines whether the present shift range can be determined, based on the signal acquired by the position sensor 51. When the control unit 52 determines that the present shift range can be determined at S506 (S506: Yes), the control unit 52 executes operations from S507 to S510 corresponding to operations from S106 to S109 in the first embodiment.

When the control unit 52 determines that the present shift range cannot be determined at S506 (S506: No), the control unit 52 proceeds to S511. At S511, the position determination portion 64 drives the motor 17 and determines the present-position. That is, the driving control portion 65 drives the motor 17, and switches the shift range of the automatic transmission 14 toward the P-range or the D-range. Since the shift range is switched according to the driving of the motor 17, the position acquirement portion 62 detects the switching edge. Thus, the position determination portion 64 determines the present-position of the motor 17, based on the switching edge detected by the position acquirement portion 62. The driving control portion 65 executes operations on and after S507, based on the present-position of the motor 17 determined at S511.

According to the fourth embodiment, when the position sensor 51 cannot determine the shift range, the driving control portion 65 drives the motor 17 to forcibly switch the shift range. Therefore, the switching edge is detected by a switch of the shift range. The position determination portion 64 determines the present-position of the motor 17, based on the switching edge detected by the position acquirement portion 62. Thus, the position of the motor 17 is determined even when other information is insufficient. As a result, even when the shift range cannot be determined, a control of the automatic transmission 14 can be continued.

According to the fourth embodiment, an example of switching the shift range to the P-range or the D-range is described. However, when a R-range request for switching the shift range to the R-range is generated (when the R-switch 132 corresponding to the R-range is operated), it is preferable that the driving control portion 65 drives the motor 17 to move toward the P-range so as to detect the switching edge. Therefore, when the R-range request is generated, the shift range is prevented from switching toward the D-range (in the reverse rotational direction). A safety of the shift range can be improved.

The present disclosure is not limited to the embodiments mentioned above, and can be applied to various embodiments within the spirit and scope of the present disclosure.

According to the above embodiment, the shift range uses the P-range, the R-range, the N-range, and the D-range as an example. However, the shift range may include more than four ranges. For example, the shift range may further include a D2-range, an S-range, or an L-range, and a combination of the above ranges.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A shift-by-wire controller for a shift-by-wire system which switches a shift range of an automatic transmission by a driving force of a motor, the shift-by-wire controller driving the motor according to an input signal, the shift-by-wire controller comprising:
    a position sensor detecting whether the automatic transmission is placed at one of a plurality of the shift ranges;
    a position acquirement portion acquiring a switching edge corresponding to a position where the shift range is switched, from the position sensor, every time that the shift range is switched;
    an encoder detecting a rotational position of the motor;
    a determining portion determining whether the rotational position can be acquired from the encoder as a present-position;
    a position determination portion driving the motor to switch the shift range, and determining a position of the motor based on the switching edge acquired by the position acquirement portion while the shift range is switch, when the determining portion determines that the present-position cannot be acquired and the position sensor detects the shift range;
    a storage portion storing driving amounts between the shift ranges acquired by the position acquirement portion as shift learning values, every time that the shift range is switched; and
    a driving control portion driving the motor to switch the shift range to a target shift range corresponding to the input signal, based on the position of the motor determined by the position determination portion and the shift learning values stored in the storage portion.

2. The shift-by-wire controller according to claim 1, further comprising:
    the driving control portion (i) calculates a target position of the motor corresponding to the target shift range as a calculated target position, based on the position of the motor determined by the position determination portion and the shift learning values stored in the storage portion, and (ii) corrects the driving amount corresponding to an amount necessary to switch the shift range to the calculated target position, based on an edge learning value corresponding to a learning value of the switching edge stored in the storage portion.

3. The shift-by-wire controller according to claim 1, further comprising:
    an initial-position learning portion learning an initial position of the motor, when the shift range is placed at a specified shift range, wherein the driving control portion drives the motor without learning the initial position by the initial-position learning portion, when the determining portion determines that the present-position can be acquired.

4. The shift-by-wire controller according to claim 1, further comprising:
   an input portion receiving an input of the shift range as a required shift range; and
   an estimating portion estimating the position of the shift range, based on the required shift range received by the input portion, a signal indicating the shift range detected by the position sensor in a normal state, and the switching edge in the normal state, wherein
   the driving control portion drives the motor from the position estimated by the estimating portion to the target shift range, when the determining portion determines that the present-position cannot be acquired.

5. The shift-by-wire controller according to claim 1, wherein
   the driving control portion drives the motor and switches the automatic transmission to an end shift range disposed at an end portion among the shift ranges, when the position sensor cannot determine the shift range, and
   the position acquirement portion detects the switching edge by a switch of the shift range.

6. The shift-by-wire controller according to claim 5, wherein
   the shift ranges include a P-range and a D-range which are disposed at two end portions, respectively, and an R-range and an N-range which are disposed between the P-range and the D-range from the P-range in the order of the R-range and the N-range, wherein the P-range is for parking, the D-range is for driving, the R-range is for reversing, and the N-range is for making the automatic transmission neutral, and
   the driving control portion drives the motor toward the P-range and detects the switching edge, when a request for switching the shift range to the P-range is generated.

7. A shift-by-wire controller for a shift-by-wire system which switches a shift range of an automatic transmission by a driving force of a motor, the shift-by-wire controller driving the motor according to an input signal, the shift-by-wire controller comprising:
   a position sensor detecting whether the automatic transmission is placed at one of a plurality of the shift ranges;
   a position acquirement portion acquiring a switching edge corresponding to a position where the shift range is switched, from the position sensor, every time that the shift range is switched;
   an encoder detecting a rotational position of the motor;
   a determining portion determining whether the rotational position can be acquired from the encoder as a present-position;
   a position determination portion driving the motor to switch the shift range, and determining a position of the motor based on the switching edge acquired by the position acquirement portion while the shift range is switched, when the determining portion determines that the present-position cannot be acquired and the position sensor detects the shift range;
   an input portion receiving an input of the shift range as a required shift range; and
   an estimating portion estimating the position of the shift range, based on the required shift range received by the input portion, a signal indicating the shift range detected by the position sensor in a normal state, and the switching edge in the normal state, wherein
   the driving control portion drives the motor from the position estimated by the estimating portion to the target shift range, when the determining portion determines that the present-position cannot be acquired.

* * * * *